United States Patent [19]

Ayers

[11] Patent Number: 4,709,356
[45] Date of Patent: Nov. 24, 1987

[54] SEISMIC ARRAY POSITIONING

[75] Inventor: Ray R. Ayers, Houston, Tex.

[73] Assignee: Shell Oil Company, Houston, Tex.

[21] Appl. No.: 800,848

[22] Filed: Nov. 22, 1985

[51] Int. Cl.⁴ .............................................. G01V 1/38
[52] U.S. Cl. ..................................... 367/19; 367/106; 367/130
[58] Field of Search .................. 367/19, 20, 130, 106, 367/117, 127, 6

[56] References Cited

U.S. PATENT DOCUMENTS

| | | | |
|---|---|---|---|
| 4,063,213 | 12/1977 | Itria et al. | 367/19 |
| 4,087,780 | 5/1978 | Itria et al. | 367/19 |
| 4,376,301 | 3/1983 | Roberts | 367/19 |
| 4,532,617 | 7/1985 | Baecker et al. | 367/19 |

FOREIGN PATENT DOCUMENTS 2138942 10/1984 United Kingdom .................. 367/19

Primary Examiner—Thomas H. Tarcza
Assistant Examiner—Ian J. Lobo

[57] ABSTRACT

The positions of seismic subarrays are determined using special hydrophones in a streamer cable which listen for acoustic signals generated from each seismic subarray.

24 Claims, 4 Drawing Figures

SEISMIC ARRAY POSITIONING

BACKGROUND OF THE INVENTION

The present invention relates to the field of marine seismic exploration. Specifically, the invention is concerned with a method and apparatus for determining the positions of seismic subarrays in relation to one or more towed marine seismic streamer.

Marine seismic exploration is usually conducted by towing one or more submerged seismic streamers through the ocean. The streamers are provided with a plurality of pressure sensors, such as hydrophones, disposed at appropriate intervals along the length thereof. One or more seismic energy source, each comprising one or more subarrays, utilize air guns to propagate pressure waves through water in the vicinity of the marine streamer and into the underlying seafloor. The pressure waves radiate in all directions, and some waves travel downwardly through the earth, a portion of the waves being reflected upwardly at levels where there is a contrast in the acoustic impedance characteristics of the strata. This is subsequently detected by the hydrophones as pressure variations in the surrounding water. These pressure variations are transformed into electrical signals by the hydrophones and transmitted via the streamer to recording apparatus onboard the tow vessel where the collected data can be interpreted to reveal information about the subsea geological formations.

It is necessary, for the signals to be meaningful, to know the location not only of the individual hydrophones with relation to the tow vessel, as disclosed in U.S. Pat. No. 4,376,301 which is incorporated hereinto, but also the position of the air gun and subarrays with respect to the streamer, such guns being preferably suspended below floats of seismic subarrays on either side of the marine streamer. Inasmuch as the tow vessel is continually moving, and since the location of the seismic subarrays and the streamer can potentially vary in relation to each other, ascertainment of the relative locations of the floats to the streamer is difficult.

As above mentioned, the prior art has developed various systems in order to ascertain the location of the marine streamer, but the prior art is remiss in providing a method for locating the seismic subarray with respect to the streamer. Accordingly, the present invention is directed to overcoming this problem in the art.

SUMMARY OF THE INVENTION

The present invention relates to a method and apparatus for use in determining the location of seismic subarrays with respect to a marine streamer, all being towed behind an exploration vessel. Accordingly, a method and means are provided for determining the positions of a seismic subarray in relation to a marine streamer, both being towed astern of a vessel, including: providing a first acoustic signal receiving means at least near the marine streamer; providing a second acoustic signal receiving means at least near the marine streamer which is spaced apart from the first acoustic signal receiving means by a known distance; providing an acoustic signal sending means at least near the seismic subarray; generating acoustic signals from the acoustic signal sending means at a known time; receiving and detecting the time of receipt of the generated acoustic signals by the first and second acoustic signal receiving means; and calculating the distance of the seismic from the marine streamer based on the known distance between the first and second acoustic signal receiving means, the known times of sending and receiving acoustic signals, and the rate of travel of sound through water at given conditions. Alternatively, the acoustic signal receiving means and the acoustic signal sending means may be switched (e.g. the seismic subarray can be provided with either acoustic signal sending or receiving means). The acoustic signal receiving means are preferably hydrophones, and the acoustic signal sending means are preferably either transponders which are triggered by acoustic interrogation or responders which are triggered electrically.

Other purposes, advantages and features of the invention will be apparent to one skilled in the art upon review of the following:

DESCRIPTION OF PREFERRED EMBODIMENTS

Figure 1:
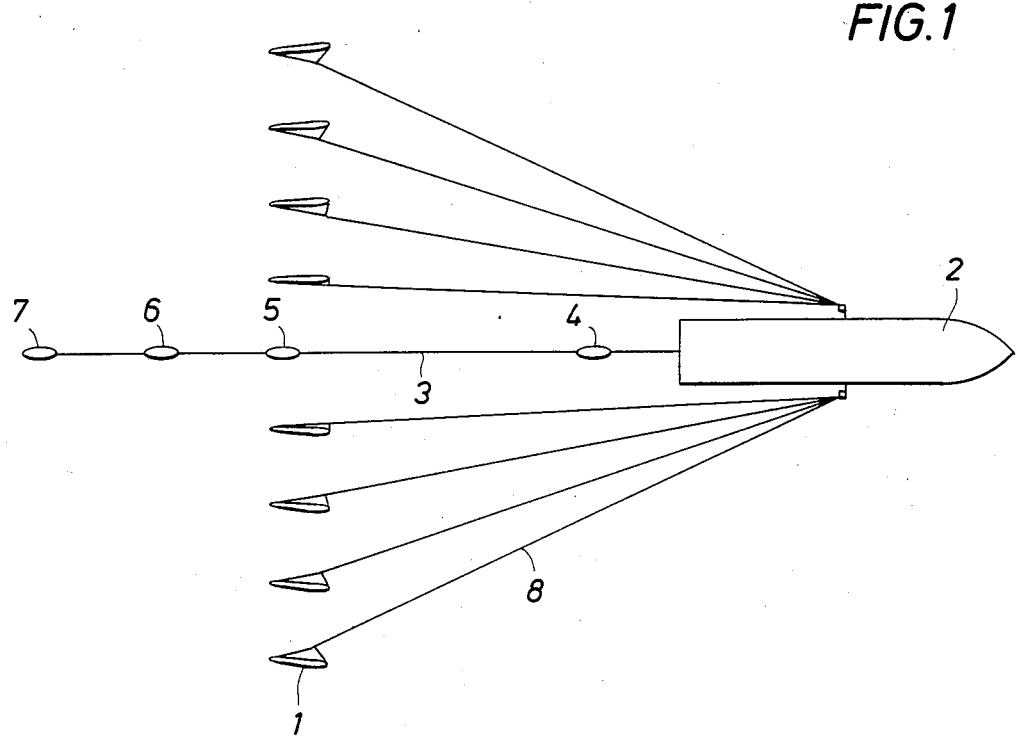
FIG. 1 is a plan view showing a distribution of a plurality of seismic subarrays with relation to a marine streamer.

As shown in FIG. 1, it is feasible to tow a large number of seismic subarrays, such as subarray 1, which are spread well apart outboard of vessel 2 in order to accomodate the large number of subarrays. This gives the flexibility to alternately fire subarrays in some desired sequence and also permits focusing seismic energy in a desired direction. In towing such a large number of subarrays, it is particularly desirable to know the position of each subarray in relation to the marine streamer 3 which may include, among other elements, a depth controller 4, hydrophones 5 and 6, and a tail buoy 7. Only one streamer is illustrated, but one or more streamers may be utilized simultaneously. Subarrays generally comprise a float with air guns suspended therebeneath and are attached to the vessel 2 by an umbilical cable 8. A typical seismic subarray useful with the invention is shown in FIG. 2 which comprises a float 9 with an air line 10 extending down to a gun support beam 11 which is, in turn, attached to the float by retractable cables 12 beneath which are a series of air guns 13.

Figure 2:
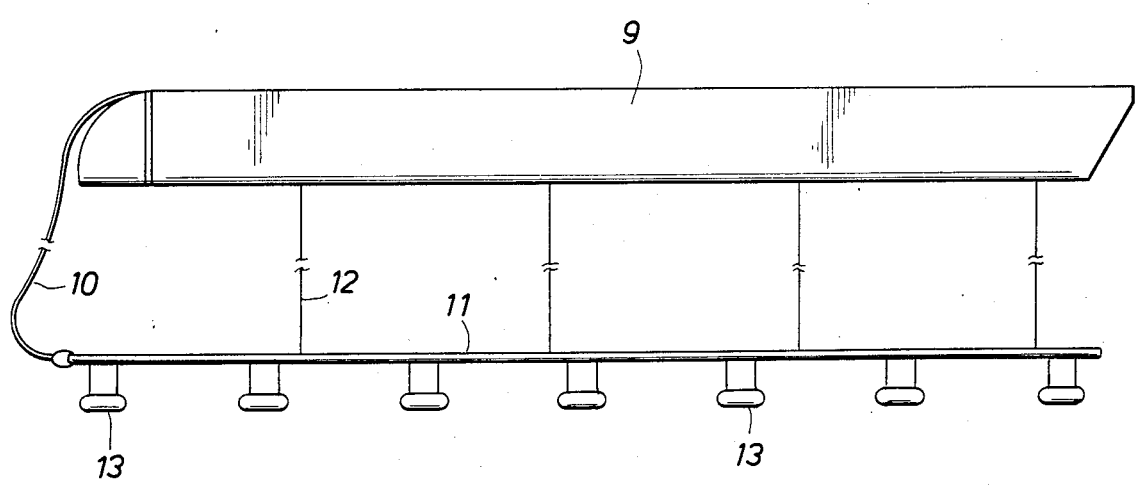
FIG. 2 shows a seismic subarray.
Figure 3:
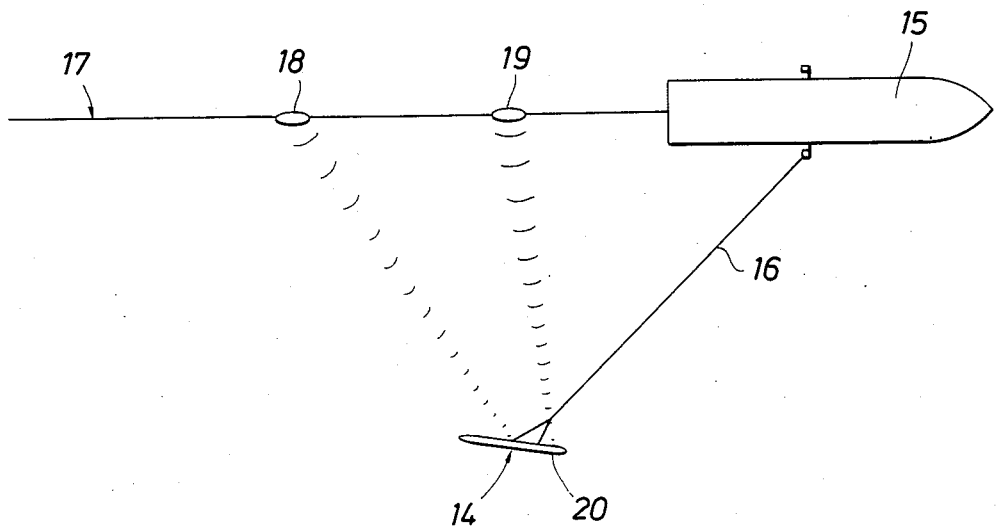
FIG. 3 shows one embodiment in accordance with the present invention.
Figure 4:
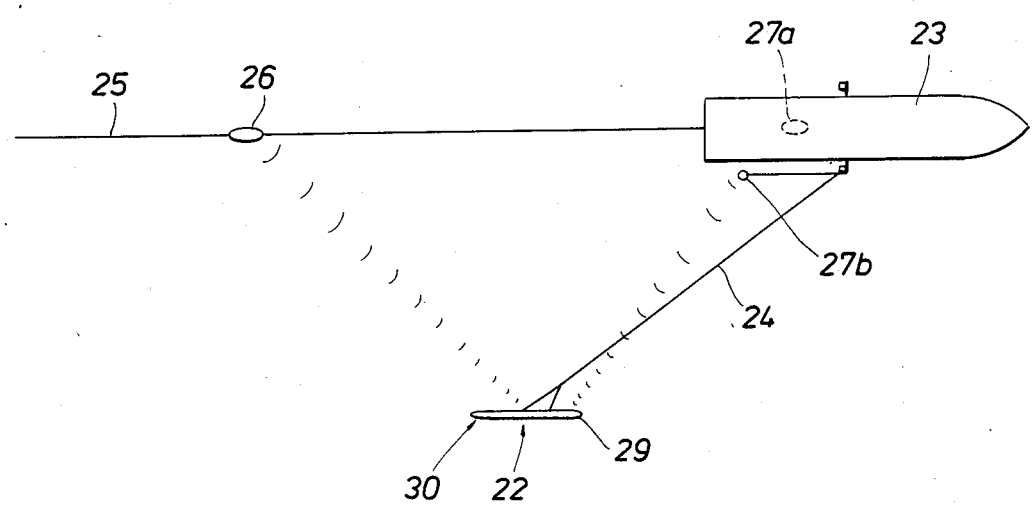
FIG. 4 shows an alternative embodiment in accordance with the present invention.

In FIGS. 3 and 4 embodiments in accordance with the present invention are shown which for purposes of emphasis omit some features shown in FIGS. 1 and 2 (e.g. the total number of subarrays). Further, the hydrophones shown in FIGS. 3 and 4 are for position measurement and are in addition to the normally used hydrophones in the seismic streamer for seismic surveying purposes. In FIG. 3 subarray 14 is towed from vessel 15 by means of an umbilical cable 16. A marine streamer 17 having two or more hydrophones 18 and 19 is towed directly behind vessel 15. The seismic subarray has one or more acoustic signal sending means 20 which is either a transponder or responder deployed on or near the seismic subarray 14. If acoustic signal sending means 20 is a transponder, then the transponder is triggered by acoustic interrogation from a seismic source or sending means. If on the other hand acoustic signal sending means 20 is a responder, it is triggered electrically by cable means (not shown) carried by umbilical cable 16. Alternatively, the seismic subarray can be provided with one or more acoustic signal receiving means and the marine streamer can be provided with two or more acoustic signal sending means. Since two signals would have to be sent from the marine streamer, it would be necessary to distinguish which was which. This could be accomplished by utilizing signals of different frequencies or providing a time delay between the two signals, etc.

In FIG. 4 there is shown a seismic subarray 22 which is towed from vessel 23 by means of an umbilical cable 24. In the marine streamer 25 there are provided one or more hydrophones 26. This embodiment is similar to the embodiment of FIG. 3 except that one hydrophone 27a (shown in phantom) or 27b is located at least near and preferably below or alongside the vessel 23. In either case, there is preferably enough distance between the vessel propellers and the hydrophone 27a or 27b to avoid problems with noise from the propellers. In both this embodiment and that shown FIG. 3 the distance between hydrophones is a known distance. Similarly to the embodiment of FIG. 3 the hydrophones may be exchanged with the responder or transponder 29 located on the seismic subarray 22.

In order to perform the calculations required to determine the distance between the marine streamer and the seismic subarray, it is necessary to know the rate of travel of sound through the water present at the time of testing. The water in different geographic locations will, of course, vary in temperature, salinity, etc. Accordingly, a calibration is performed wherein the rate of travel of sound through the water present at that time is determined between two points which are a known distance apart. A preferred calibration means is the subarray 22 which is, for example, 60 feet from bow to stern. A special hydrophone 30 mounted at the stern of the subarray can be used to receive a calibration signal from transponder/responder 29. The calibration signal can be the same signal sent to hydrophones 26 and 27a or 27b, or the calibration signal can be a separate signal. It is manifest, of course, that hydrophone 30 can be exchanged in location with transponder/responder 29. Other locations which are a known distance apart can be used for the calibration operation.

Although a preferred embodiment of the invention has been shown and described, it will be appreciated by those skilled in the art that many modifications may be made without departing from the spirit of the invention.

What is claimed is:

1. A method for determining the position of a seismic subarray in relation to a marine streamer, both being towed behind the stern of a vessel, comprising:
   providing a first acoustic signal receiving means at least near the marine streamer;
   providing a second acoustic signal receiving means which is spaced-apart from the first acoustic receiving means by a known distance;
   providing an acoustic signal sending means at least near the seismic subarray;
   generating acoustic signals from the acoustic signal sending means at a known time;
   receiving and detecting the time of receipt of the generated acoustic signals by the first and second acoustic signal receiving means; and
   calculating the distance of the seismic subarray from the marine streamer based on the known distance between the first and second acoustic signal receiving means, the known times of sending and receiving acoustic signals, and the rate of travel of sound through water at given conditions.

2. The method of claim 1 wherein the second acoustic signal receiving means is at least near the vessel.

3. The method of claim 1 wherein the second acoustic signal receiving means is at least near the marine streamer.

4. The method of claim 1 wherein the acoustic signal receiving means are hydrophones.

5. The method of claim 1 wherein the acoustic signal sending means is a transponder which is triggered by acoustic interrogation.

6. The method of claim 1 wherein the acoustic signal sending means is a responder which is triggered electrically.

7. A method for determining the position of a seismic subarray in relation to a marine streamer, both being towed behind the stern of a vessel, comprising:
   positioning a first acoustic signal sending means at least near the marine streamer;
   positioning a second acoustic signal sending means which is spaced-apart form the first acoustic signal sending means by a known distance;
   positioning an acoustic signal receiving means at least near the seismic subarray;
   generating acoustic signals from the acoustic signal sending means at known times;
   receiving and detecting the times of receipt of the generated acoustic signals by the acoustic signal receiving means; and
   calculating the distance of the seismic subarry from the marine streamer based on the known distance between the first and second acoustic signal sending means, the known times of sending and receiving acoustic signals, and the rate of travel of sound through water at given conditions.

8. The method of claim 7 wherein the second acoustic signal sending means is at least near the vessel.

9. The method of claim 7 wherein the second acoustic signal sending means is at least near the marine streamer.

10. The method of claim 7 wherein the acoustic signal receiving means is a hydrophone.

11. The method of claim 7 wherein the acoustic signal sending means are transponders which are triggered by acoustic interrogation.

12. The method of claim 7 wherein the acoustic signal sending means are responders which are triggered electrically.

13. An apparatus for determining the position of a seismic subarray in relation to a marine streamer, both being towed behind the stern of a vessel, comprising:
   a first acoustic signal receiving means at least near the marine streamer;
   a second acoustic signal receiving means which is spaced-apart from the first acoustic signal receiving means by a known distance;
   an acoustic signal sending means at least near the seismic subarray;
   means for generating acoustic signals from the acoustic signal sending means at a known time;
   means for receiving and detecting the time of receipt of the generated acoustic signals by the first and second acoustic signal receiving means; and
   means for calculating the distance of the seismic subarray from the marine streamer based on the known distance between the first and second acoustic signal receiving means, the known times of sending and receiving acoustic signals, and the rate of travel of sound through water at given conditions.

14. The apparatus of claim 13 wherein the second acoustic signal receiving means is at least near the vessel.

15. The apparatus of claim 13 wherein the second acoustic signal receiving means is at least near the marine streamer.

16. The apparatus of claim 13 wherein the acoustic signal receiving means are hydrophones.

17. The apparatus of claim 13 wherein the acoustic signal sending means is a transponder which is triggered by acoustic interrogation.

18. The apparatus of claim 13 wherein the acoustic signal sending means is a responder which is triggered electrically.

19. An apparatus for determining the position of a seismic subarray in relation to a marine streamer, both being towed behind the stern of a vessel, comprising:
   a first acoustic signal sending means at least near the marine streamer;
   a second acoustic signal sending means which is spacedapart from the first acoustic signal sending means by a known distance;
   an acoustic signal receiving means at least near the seismic subarray;
   means for generating acoustic signals from the acoustic signal sending means at known times;
   means for receiving and detecting the times of receipt of the generated acoustic signals by the acoustic signal receiving means; and
   means for calculating the distance of the seismic subarray from the marine streamer based on the known distance between the first and second acoustic signal sending means, the known times of sending and receiving acoustic signals, and the rate of travel of sound through water at given conditions.

20. The apparatus of claim 19 wherein the second acoustic signal sending means is at least near the vessel.

21. The apparatus of claim 19 wherein the second acoustic signal sending means is at least near the marine streamer.

22. The apparatus of claim 19 wherein the acoustic signal receiving means is a hydrophone.

23. The apparatus of claim 19 wherein the acoustic signal sending means are transponders which are triggered by acoustic interrogation.

24. The apparatus of claim 19 wherein the acoustic signal sending means are responders which are triggered electrically.

* * * * *